(12) United States Patent
Kiest, Jr.

(10) Patent No.: US 8,550,121 B2
(45) Date of Patent: Oct. 8, 2013

(54) METHOD AND APPARATUS FOR LINING A PIPE

(75) Inventor: Larry W. Kiest, Jr., Ottawa, IL (US)

(73) Assignee: LMK Technologies, LLC, Chicago, IL (US)

( * ) Notice: Subject to any disclaimer, the term of this patent is extended or adjusted under 35 U.S.C. 154(b) by 225 days.

(21) Appl. No.: 13/070,304

(22) Filed: Mar. 23, 2011

(65) Prior Publication Data

US 2011/0197413 A1  Aug. 18, 2011

Related U.S. Application Data

(63) Continuation-in-part of application No. 12/713,619, filed on Feb. 26, 2010, now Pat. No. 8,118,063.

(60) Provisional application No. 61/155,742, filed on Feb. 26, 2009.

(51) Int. Cl.
*F16L 55/16* (2006.01)

(52) U.S. Cl.
USPC ............ 138/98; 138/97; 156/461; 405/150.1; 264/269

(58) Field of Classification Search
USPC .................. 138/98, 97; 156/461; 405/150.1; 264/269, 36.16
See application file for complete search history.

(56) References Cited

U.S. PATENT DOCUMENTS

| | | | | |
|---|---|---|---|---|
| 4,995,761 | A * | 2/1991 | Barton | 405/184.1 |
| 5,186,987 | A * | 2/1993 | Imoto et al. | 428/34.5 |
| 5,354,586 | A * | 10/1994 | Yokoshima et al. | 428/36.1 |
| 5,698,056 | A * | 12/1997 | Kamiyama et al. | 156/218 |
| 6,019,136 | A * | 2/2000 | Walsh et al. | 138/98 |
| 2002/0083990 | A1* | 7/2002 | Lundman | 138/98 |
| 2003/0066567 | A1* | 4/2003 | Manners | 138/98 |
| 2006/0130923 | A1* | 6/2006 | Lepola et al. | 138/98 |
| 2007/0113971 | A1* | 5/2007 | Driver et al. | 156/287 |
| 2007/0240827 | A1* | 10/2007 | Driver | 156/461 |
| 2008/0251151 | A1* | 10/2008 | Tanaka et al. | 138/98 |

* cited by examiner

*Primary Examiner* — Patrick F Brinson
(74) *Attorney, Agent, or Firm* — McKee, Voorhees & Sease, P.L.C.

(57) ABSTRACT

A new apparatus for repairing a damaged portion of a pipe includes a liner having a tubular sleeve of resin absorbent material that includes a plastic film laminated to an exterior surface of the sleeve. The plastic film contains resinous material in the liner, and is modified to breech the integrity of the plastic film and expose the resinous material to a junction of a main and lateral pipe. A method of lining a junction of a main and lateral pipe using the liner is also provided.

14 Claims, 6 Drawing Sheets

METHOD AND APPARATUS FOR LINING A PIPE

CROSS-REFERENCE TO RELATED APPLICATIONS

This application is a continuation-in-part of U.S. patent application Ser. No. 12/713,619, which claims priority under 35 U.S.C. §119 of a provisional application Ser. No. 61/155,742 filed Feb. 26, 2009, which applications are hereby incorporated by reference in their entireties.

BACKGROUND OF THE INVENTION

The present invention relates to an apparatus and method for repairing pipe, such as underground sewer pipe and the like.

Prior methods for repairing damaged sections of pipe include moving a liner tube impregnated with a resinous material capable of curing and hardening to a position within the pipe where the damaged portion is located. Once the liner tube is positioned within the host pipe, it is pressurized, causing the liner to press against the interior wall of the host pipe, and the liner is cured by applying heat, such as with steam or hot water. These liners can also be cured at ambient temperatures by a chemical mixture which generates an exothermic reaction or by ultraviolet light. The liner tube forms an interior liner in the pipe for the pipeline being repaired. Such a process is commonly known as cured-in-place pipelining.

The liner tube is positioned within the pipe by pulling, pushing or inverting the liner. Pulling or pushing a liner into position within a pipe can be an efficient process, particularly in situations where the liner must only travel a short distance and need not navigate significant bends in the pipe. Typically, a flat sheet liner is wrapped around an inflation plug to form a tube with the longitudinal edges of the sheet overlapping. The inflation plug with liner is then pushed or pulled into position adjacent the damaged section of pipe.

Although a pull-in-place or push-in-place installation is feasible in many instances, problems remain. For example, prior art lining tubes are typically made of a fabric material that is resin absorbent. Once the resin is applied to the liner, there is nothing around the outside of the liner to contain the resin. Consequently, resin is wiped off of the liner when the liner rubs against the interior of the host pipe as the liner is either pulled or pushed into position. Workers must also take great care so as to not come into contact with the resin and also avoid contaminating the exposed resin impregnated liner.

Prior art liners pushed or pulled in place are also not well suited for lining at bends in the pipeline. Flat sheet liners with overlapping edges are not capable of stretching or expanding sufficiently to avoid folds in the liner when pressed against the interior of the host pipe. In addition, flat sheet style liners must be banded, strapped, tied or otherwise attached with fasteners to the inflation plug to avoid falling off the plug prior to inflating the plug and pressing the liner against the interior of the host pipe.

Additionally, there are deficiencies in the art of liners for inversion systems. U.S. Pat. No. 5,927,341 to Taylor teaches impregnating a liner with a resinous material by thoroughly saturating the liner tube. At one end of the liner tube, a collar or flat sheet may be attached, to act as a brim within the main pipe. The lateral tube and the collar or flat sheet is placed onto a bladder device, where a lateral bladder is already inverted inside the bladder device. The lateral bladder is then everted into the lateral liner tube. The lateral bladder is then reinverted within the bladder device, along with the lateral liner. The loaded bladder device is then aligned with the junction to be repaired, and the lateral bladder is everted a second time, placing the lateral liner against the interior of the lateral pipe. This will be referred to as a "two-step inversion process."

There is an advantage to using a two-step inversion process. The fact that an inflatable bladder may be used multiple times provides the greatest advantage. Since the liner is simply placed on top of the bladder device, the bladders may be easily reused, as long as durable materials are used. However, as presently used in the art, there are several disadvantages to using a two-step inversion process. First, if a coating is present on the lateral liner, the coating will be pressed against the interior of the pipe wall when using this two-step inversion process. The coating side of the lateral liner will be pressed against the interior walls of the host pipe because the coating acts to contain the resinous material during the impregnation process. Pressing a coating against the interior walls of a host pipe may be problematic because in order to seal a lateral pipe, resin migration into the fractures and the open joints of the host pipe is required. This resin migration prevents water infiltration/exfiltration and to prevent roots from entering the system. Additionally, ASTM F-1216 requires resin migration to the lateral pipe, which is the specification that engineers use to determine the quality of a pipe sealing product.

These problems have been addressed previously in the art. For example, U.S. Pat. No. 6,039,079 to Kiest discloses a method of lining a pipe where a lateral liner tube is impregnated with a resinous material after being placed into a launcher device. This addresses the problem of needing a coated liner, because the inflatable bladder acts to contain the resin within the liner. While this allows the coating of the liner to be on the inside of the cured-in-place pipe, encouraging resin migration into the host pipe structures, the bladder is generally not available for reuse because it may be damaged or stretched during the impregnation or installation processes.

In light of the foregoing, the primary objective of the present invention is to provide an improved method and apparatus for lining pipe.

Another objective of the present invention is to provide a new resin absorbent liner that contains the resin in the liner prior to stretching the liner and pressing it against the interior of the host pipe.

Another objective of the present invention is to provide a new lining apparatus for pull-in-place or push-in-place applications that prevents resin from being wiped off of the liner as it is moved into the pipe, yet allows the resin to contact the interior of the host pipe once the liner is expanded or stretched under pressure.

Another objective of the present invention is to provide a new lining apparatus and method for effectively lining at bends and turns in the pipeline.

Another objective of the present invention is to provide a new lining apparatus and method for inversion applications, where resinous material is permitted to migrate through an outer coating of a liner into the cracks and fissures of the interior of a host pipe.

Another objective of the present invention is to provide a new lining apparatus and method for use with inversion applications, where a single-piece main and lateral bladder is used for renewing the junction of a sewer main/lateral connection multiple times.

A still further objective of the present invention is to provide a new lining apparatus which is economical to manufacture, durable in use and efficient in operation.

SUMMARY OF THE INVENTION

According to one aspect of the present invention, an apparatus for repairing a damaged portion of a pipe is provided. The apparatus includes a liner with a tubular sleeve of a resin absorbent material that is capable of being stretched circumferentially and a plastic film disposed on an exterior surface of the sleeve. Once the liner is impregnated with a resinous material, the plastic film contains the resin and prevents the resin from being wiped off of the liner while outside of the pipe and as the liner is being moved to an operative position adjacent the damaged section of pipe in need of repair. Stretching the liner circumferentially toward the damaged section of pipe breeches the integrity of the plastic film to expose the resinous material and tubular sleeve to the damaged section of the pipe.

In a preferred form of the invention, the plastic film is a TPU or like polymer film with a wall thickness of approximately 1-2 mils that is laminated to the sleeve. The preferred tubular sleeve is also capable of being stretched to a diameter of at least approximately 100% greater than its non-stretched diameter. Allowing the sleeve to stretch to such an extent allows the sleeve to conform to the shape of the pipe even at bends and curves in the pipeline without creating undesirable folds in the liner.

A second aspect of the invention is a new method of lining a damaged section of pipe using a liner having a tubular sleeve of resin absorbent material and a plastic film laminated to an exterior surface of the sleeve. The liner is impregnated with a resinous material capable of curing and hardening. The liner is moved into the pipe to a position adjacent the damaged section of the pipe. Once in position, the liner is stretched circumferentially toward the damaged section of pipe to thereby breech the integrity of the plastic film and expose the resinous material in the tubular sleeve to the damaged section of the pipe. The liner is pressed against the damaged section of a pipe, allowing the resinous material to cure and harden.

In a preferred form of this second method, the liner is positioned on an inflatable plug with a substantially non-stick bladder material located therebetween. The tubular non-stick bladder material is banded to the front end of the inflatable plug such that the bladder material peels away from the cured liner as the inflatable plug is removed.

According to a third aspect of the present invention, an apparatus for repairing a junction of a main and lateral pipe is provided. The apparatus includes a liner with a tubular sleeve of a resin absorbent material and a plastic film disposed on an exterior surface of the sleeve. The plastic film should be perforated prior to or after the impregnation process. The perforations may be formed by a knife, a roller, needles, or other methods of perforating a plastic sheet. Once the liner is impregnated with a resinous material, the plastic film contains the resin and prevents the resin from being wiped off of the liner while outside of the pipe and during the impregnation process. Once the resin-impregnated liner is placed against the walls of the junction by a substantially non-stick inflatable bladder, the pressure applied by the bladder forces the resin through the perforations in the coating and into the cracks and fissures in the host pipe(s). Optionally, the liner may be stretched circumferentially toward the junction, forcing the perforations in the plastic film open further to expose the resinous material to the damaged section of the junction.

DETAILED DESCRIPTION OF THE PREFERRED EMBODIMENT

Figure 1:
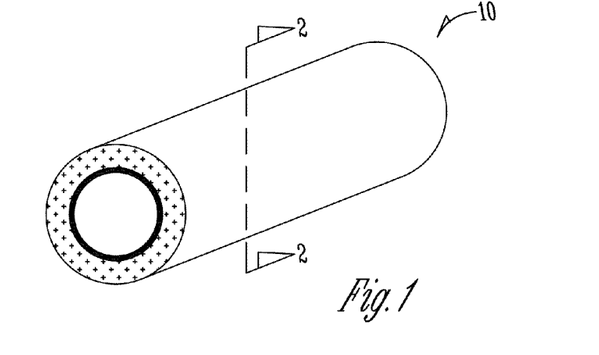
FIG. 1 is a perspective view of a liner from a preferred embodiment of the present invention.

FIG. 1 shows a perspective view of a preferred liner 10 of the present invention. The liner 10 is formed by a tubular sleeve 12 including a fabric fiber material which can preferably be stretched circumferentially up to at least approximately 100% of its non-stretched diameter. The sleeve 12 is preferably formed from a sheet of material stitched about its longitudinal edges. A preferred fabric for the sleeve 12 is a material known as "stitch bond" distributed by LMK Enterprises, Inc. of 1779 Chessie Lane, Ottawa, Ill. 61350.

Figures 2, 3:
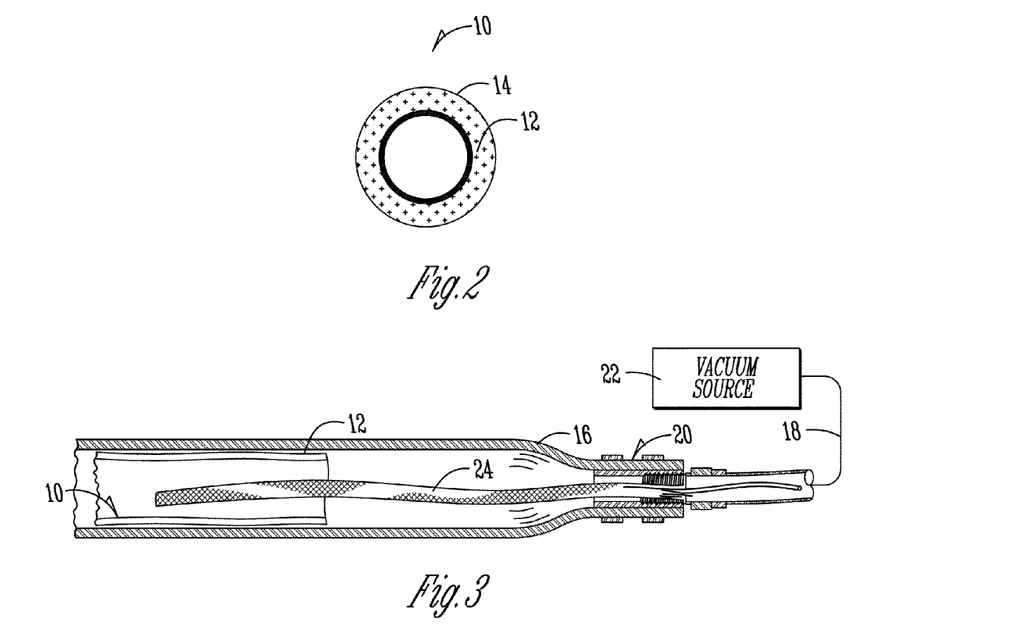
FIG. 2 is a sectional view of the liner in FIG. 1 taken along line 2-2 in FIG. 1.
FIG. 3 is a sectional view of the preferred liner of the present invention ready for impregnation of a thermal-set resin using a vacuum process.

The preferred liner 10 also includes a plastic film 14 laminated to an exterior surface of the tubular sleeve 12. The preferred plastic film 14 has a thickness of approximately 1-2 mils and is made of TPU, but could be made of PVC or a similar polymer film. The plastic film 14 is cured and then laminated to the sleeve 12 using an adhesive or glue as is known in the art.

Figure 4:
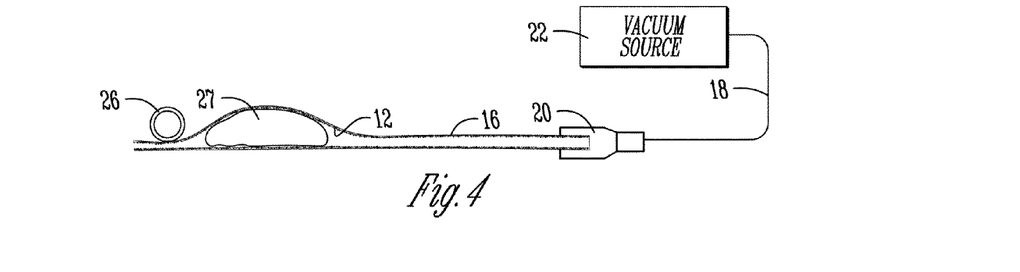
FIG. 4 is a schematic view showing the vacuum impregnation process.

The sleeve 12 is impregnated with a resin, preferably a thermal-set resin, which is forced into the fabric fibers. A method of impregnating the sleeve 12 with the resin is shown in FIGS. 3 and 4. More particularly, the fabric fibers of the sleeve 12 are on the inside of the sleeve with the plastic film 14 on the exterior of the sleeve 12. One end of the sleeve 12 is connected to a vacuum bag using tape or other adhesive. The opposite end of the vacuum bag 16 is connected to a vacuum hose 18 through a threaded coupling 20. The vacuum hose 18 is connected to a vacuum source 22, as seen in FIGS. 3 and 4. A wick 24 extends through the length of the vacuum bag 16 and functions to expel air from the sleeve 12 during the resin impregnation process.

As shown in FIG. 4, a slug 27 of resin is introduced into the open end of the sleeve 12 and is forced through the sleeve so as to impregnate the fabric fibers. A pipe 26 may be rolled over the sleeve 12 so as to push the resin 27 through the sleeve. Simultaneously or alternatively, the vacuum source 22 can be activated to pull the resin slug 27 through the sleeve 12, thereby coating and impregnating the fabric fibers with the resin. After this resin impregnation process is completed, the sleeve 12 is in the form of a flattened tube with the plastic film 14 still on the outside and the resin coated fibers on the inside.

As an alternative to the vacuum impregnation process, the resin can be poured into the liner tube and then pressed into the fibers by a person or other means in a manual impregnation process.

Once the liner 10 is impregnated with resin, the plastic film 14 on the outside of the sleeve 12 helps to contain the resin and prevent it from being wiped off or coming into contact with persons or objects prior to stretching the sleeve 12 and pressing the liner 10 against the interior of host pipe at the damaged section of pipe. The plastic film 14 is very thin to begin, preferably 1-2 mils thick. As the sleeve 12 stretches or expands radially outwardly, the plastic film 14 becomes even thinner and eventually the stretching of the sleeve 12 breeches the structural integrity of the plastic film 14, which becomes extremely porous. This unique characteristic of the plastic film 14 helps contain the resin in the liner 10 prior to stretching the tubular sleeve 12 and pressing the liner 10 against the damaged section of pipe.

The liner 10 is preferably installed in the pipe by using an inflatable plug. Inflatable plugs normally include an inflatable rubber sleeve secured between end plates. Inflatable plugs for installing cured-in-place liners are well known in the art. For example, push-type and pull-type inflatable plugs are available from Logiball, Inc. of 440 Papin Street, Quebec, QC G1P 3T9 and 21 Long Pond Road, Jackman, Me. 04945. Push-type inflatable plugs are often used when the liner must only be moved a relatively short distance within the pipe or there is no convenient downstream manhole or other access point from which to pull in the plug. For example, a push-type inflatable plug may be used to push a liner through a cleanout and into a lateral sewer pipe for a spot repair on a damaged portion of the lateral pipe 124. A rigid hose assembly can be used to push the inflatable plug with liner through the pipe, as is known in the art. Alternatively, an air hose with fiberglass push rod disposed therein can be used. The fiberglass push rod provides for greater stiffness when pushing the plug long distances, and the push rod can be sized so as to allow for air to pass through the hose and inflate the plug. A sealing gland with O-ring allows the hose with rod to slide forward within the plug into contact with the leading end of the plug, which aids in pushing the plug through the pipe. Similarly, the hose with rod can be pulled back until stopped by a retaining ring at the opposite end of the plug, which aids in pulling the plug out of the pipe after installation of the liner.

Figure 5:
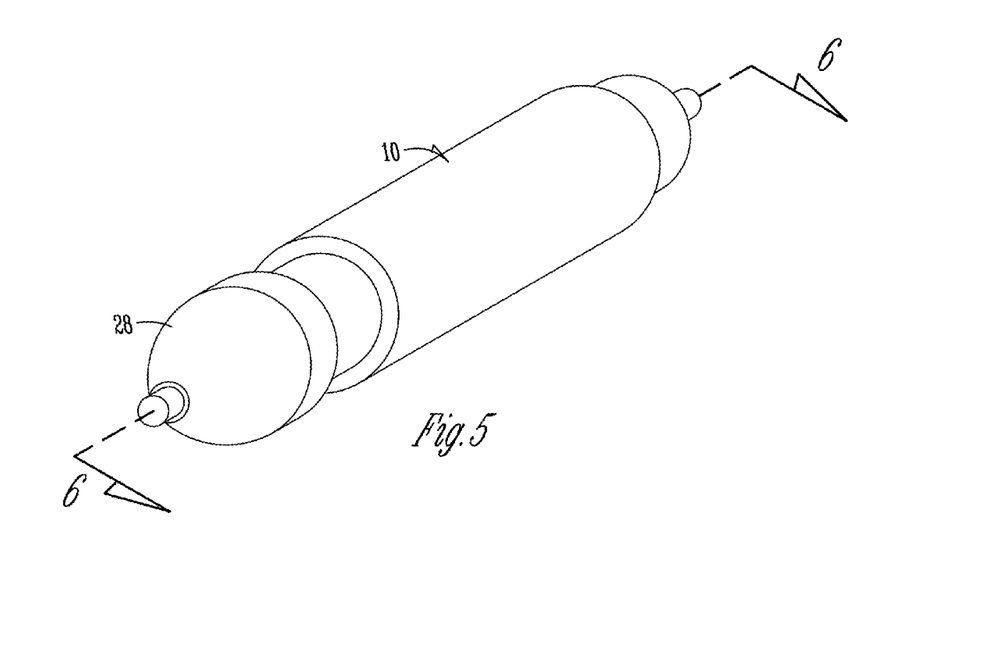
FIG. 5 is a perspective view of the preferred liner mounted on an inflatable plug.

After the liner 10 has been "wet out" with resin, the liner is pulled over an inflatable plug 28. A liner 10 mounted on the inflatable plug 2 is shown in FIG. 5. The elastic properties of the liner 10 allow it to stay in place on the inflatable plug 28 without the use of bands, straps, strings or other fasteners.

Figure 6:
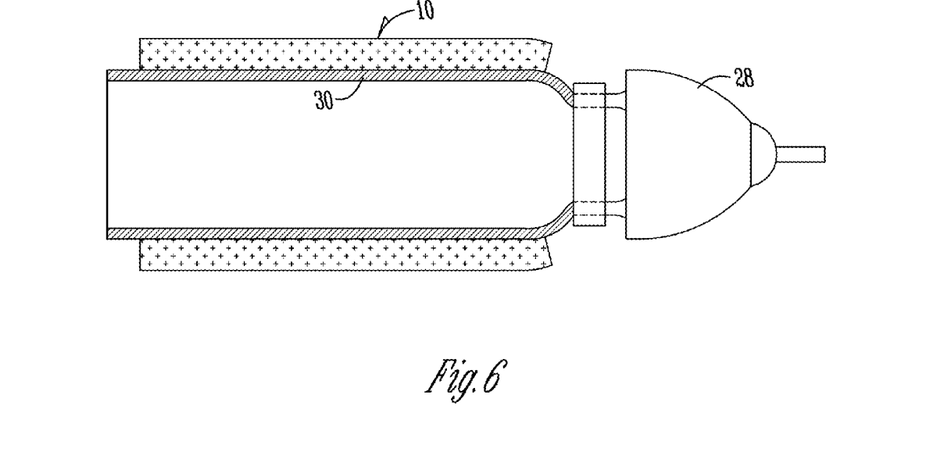
FIG. 6 is a cross-sectional view of the device shown in FIG. 5 taken along line 6-6 in FIG. 5.

A cross-sectional view of the assembly in FIG. 6 shows a tubular sleeve of non-stick bladder material 30 disposed between the inflatable plug 28 and the liner 10. The purpose of the non-stick sleeve of bladder material 30 is to facilitate removal of the plug 28 after the liner 10 has cured and hardened in the pipe. The non-stick bladder material is preferably formed from a fiber reinforced non-stick plastic material, which includes a scrim reinforcing fabric coated with a translucent or semi-transparent thermo plastic elastomer, such as a thermo plastic polyolefin (TPO) or vulcanizate (TPUV). The preferred non-stick bladder material is disclosed in application Ser. No. 12/026,209, the contents of which are incorporated herein by reference.

The non-stick sleeve 30 is preferably attached to the inflation plug 28 by banding a non-stick sleeve to the front end of the plug. Banding the non-stick sleeve 30 to the front end of the plug 28 maintains the non-stick sleeve in place as the inflatable plug is pulled or pushed into position along the pipe. Banding only at one end also causes the non-stick sleeve 30 to invert during removal of the inflation plug 28, which facilitates separation of the non-stick sleeve 30 from the liner 10 once the liner is cured and hardened in the pipe.

Figure 7:
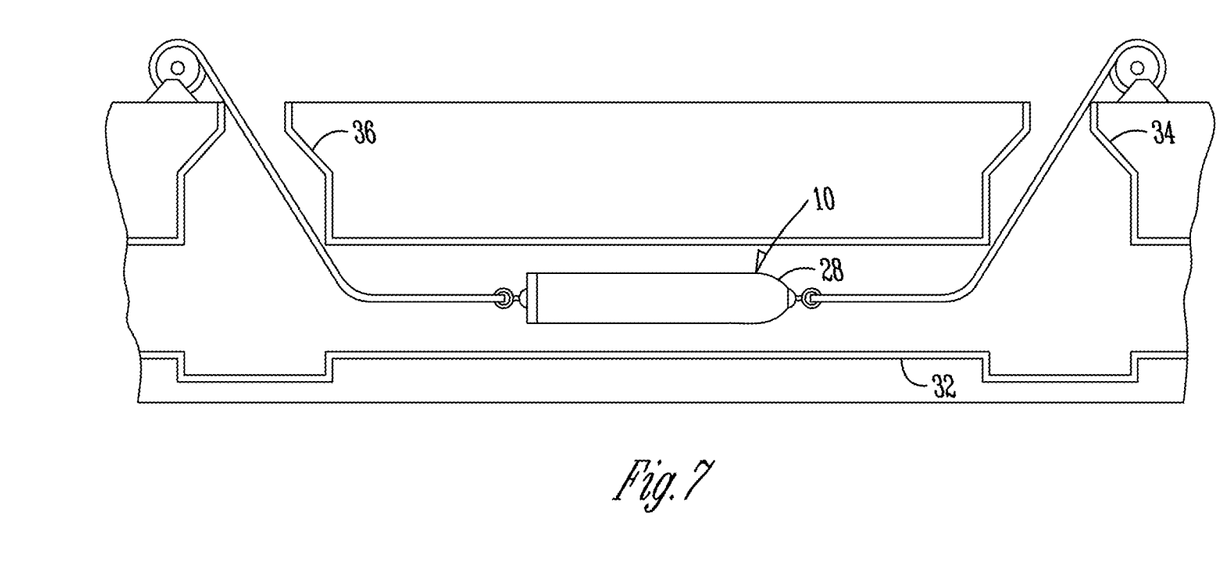
FIG. 7 is a schematic view illustrating a preferred method of the present invention for repairing a portion of a damaged pipeline extending between two manholes.

FIG. 7 shows a sectional view of a main sewer pipe 32 in communication with an upstream manhole 34 and downstream manhole 36. To perform a spot repair in a main sewer pipe 32 using a pull-in-place process, the inflatable plug 28 with liner 10 is introduced into the main pipe through one of the manhole openings. The plug 28 is drawn into the pipe 32 by means of a winch cable attached to the front end of the plug and extending through an upstream manhole or other access point. As the inflatable plug 28 with liner 10 moves through the pipe 32, the plastic film 14 prevents the resin from wiping off on the pipe.

Figure 9:
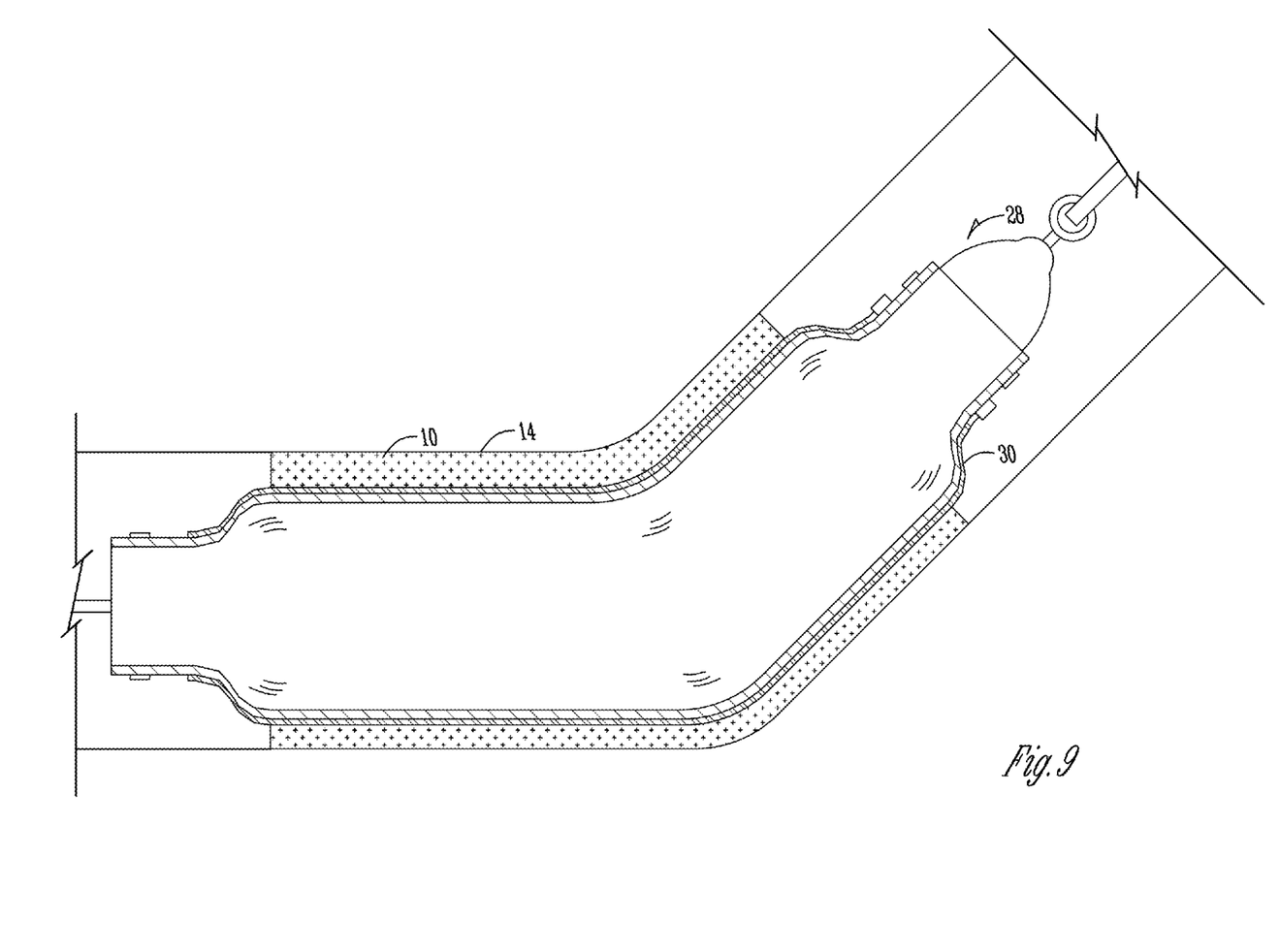
FIG. 9 is a sectional view similar to FIG. 8, showing the liner pressed against a bend in the pipeline.

Once the inflation plug 28 with liner 10 is moved into operative position adjacent the damaged section of pipe, the inflation plug is inflated with air or other liquid under pressure from a convenient fluid source, causing the liner to stretch radially outwardly toward the interior of host pipe. Stretching the liner 10 breeches the structural integrity of the plastic film 14 on the outside of the sleeve 12. This allows the resin and sleeve 12 to become exposed to the host pipe. The liner 10 continues to stretch under pressure and is pressed against the interior of the host pipe, allowing the liner to cure and harden. The inflation plug 28 remains inflated while the resin cures. Upon curing of the resin, the liner 10 is bonded and mechanically adhered to the interior of the pipe 32. The expansion of the inflatable plug 28 assures that no angular spaces reside between the liner 10 and the host pipe. Also, the stretching of the sleeve 12 from a first unstretched diameter to an enlarged diameter matching the contours of the interior of the host pipe precludes undesirable folds in the liner 10. The liner 10 is preferably sized to stretch in the pipe to a diameter at least 50% greater than the pre-inflation diameter. In a most preferred form, the liner 10 is sized approximately half of the internal diameter of the host pipe. The liner 10 should stretch such that it conforms to the shape of the pipe without folds in the liner. Stretching the sleeve 12 also enables the liner 10 to be used at bends or turns in the pipe. This is illustrated in FIG. 9.

After the resin cures, the inflation plug 28 is deflated and removed from the cured liner 10. Removing the inflation plug 28 causes the non-stick sleeve 30 to invert and pull away from the interior of the cured liner 10.

Figure 8:
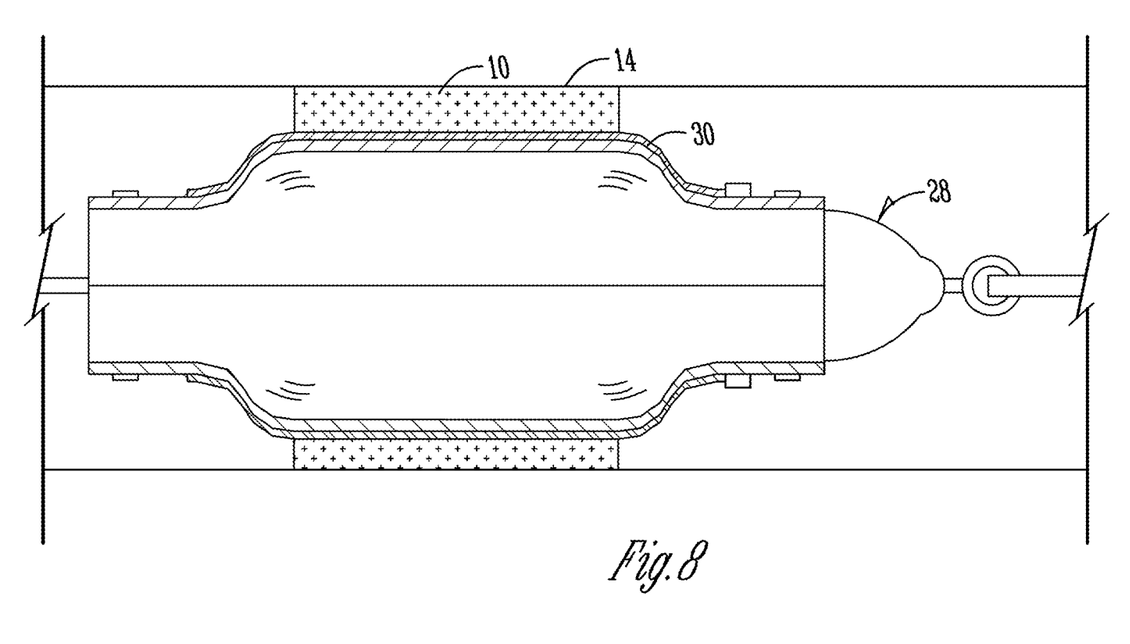
FIG. 8 is a sectional view at the damaged section of pipe after the liner has been stretched and pressed against the interior of the pipe.

FIG. 8 is a sectional view of the lining apparatus with the inflatable plug 28 inflated, pressing the liner 10 against the host pipe. As illustrated in FIG. 8, the plastic film previously on the outside of the sleeve has lost its structural integrity and becomes part of the resin/liner material mechanically adhered to the host pipe.

Although FIGS. 7 and 8 illustrate a pull-in-place style installation, persons skilled in the art having the benefit of this disclosure will recognize that the lining methods and apparatus disclosed herein are also applicable to push-in-place installations.

Figure 10:
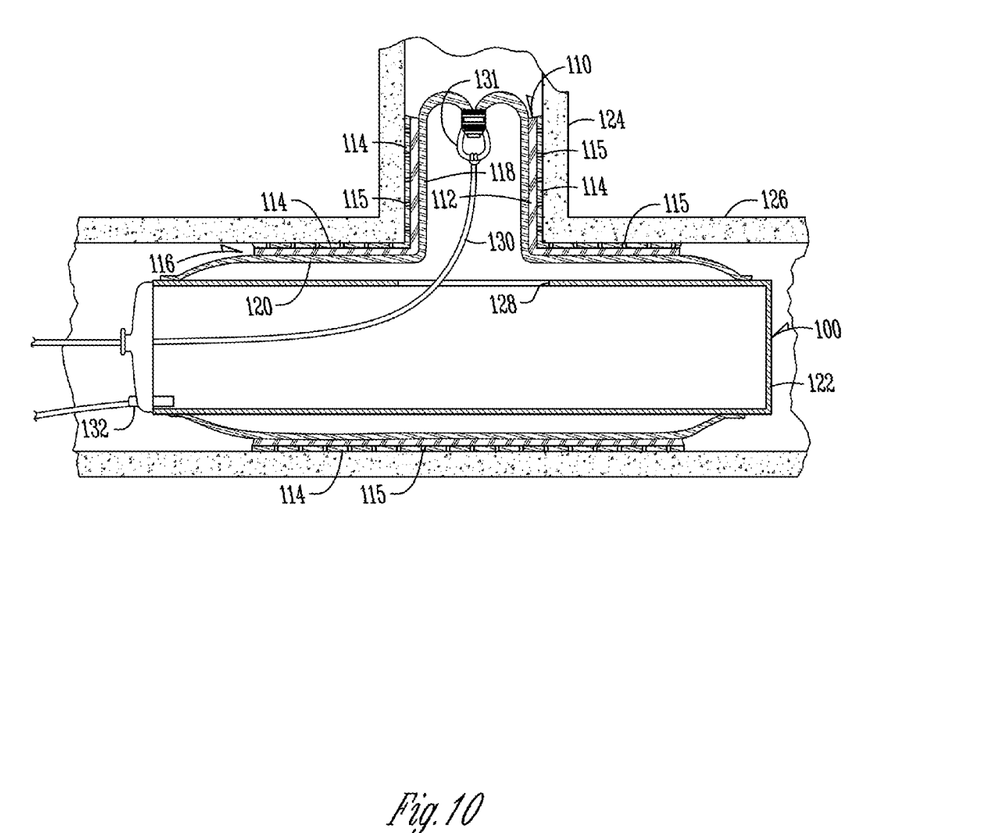
FIG. 10 is a sectional view of a junction of a main and lateral pipe of an embodiment for inversion applications, where resinous material is permitted to migrate through an outer coating of a liner into the cracks and fissures of the interior of a host pipe.

FIG. 10 is a sectional view of a lining assembly 100 for the junction of a main and lateral pipe 124 for use with inversion applications, where resinous material is permitted to migrate through an outer coating of a liner into the cracks and fissures of the interior of a host pipe. This embodiment will allow an operator to use a single bladder many times yet still achieve resin migration from the liner through a plastic film and against the walls of the host pipe junction.

In this embodiment, a lateral liner 110 having a fabric layer 112, a plastic film layer 114, and a main liner portion 116 is impregnated with a resinous material. The lateral liner 110 is placed onto a launcher device 122 having a main bladder 120 and a lateral bladder 118. The main bladder 120 and lateral bladder 118 may comprise a single, unitary piece that is fluidly connected. Alternatively, the main bladder 120 and lateral bladder 118 may be a two-piece system where the bladders are unattached and/or not fluidly connected.

The fabric layer 112 and film layer 114 are similar to the embodiments described above, with the proviso that they are constructed of materials suitable for inversion methods. Usually, materials are suitable for inversion methods if the tensile modulus of the uncured unimpregnated material is less than about 8 gigpascals, preferably less than about 2 gigapascals. Additionally, the plastic film layer of this embodiment may be much more substantial than the film layer described with respect to the other embodiments. For instance, the thickness of this film layer may be up to 30 mils thick or more.

Preferably after the fabric layer 112 of the lateral liner 110 has been impregnated with a resinous material, the coating or plastic film layer 114 may be modified. The film layer may be modified by providing perforations 115 to the film layer 114. The perforations may travel through the thickness of the plastic film layer or only penetrate partially through the layer. This may be achieved in the field by placing slits in the film layer 114, such as by using a razor knife. Pins may be used to puncture the film layer to provide pinholes. A roller with sharp pin-like projections may be used to provide pinhole perforations 115 to the coating. It should also be noted that the perforations 115 may be imparted onto the coating prior to impregnating the liner with a resinous material. For instance, a film layer may be imparted to a fabric layer in a manufacturing facility by adhesives or other bonding methods. Once the film layer has been imparted to the fabric, the film layer may be perforated by an automated process, such as needling or slitting. In embodiments where the perforations only penetrate partially through the film layer, the pressure imparted to the liner by the bladder, or stretching of the lateral liner 110 should breech the perforation, allowing resin to flow through the plastic film layer 114.

The main bladder 120 and lateral bladder 118 should be constructed of a non-stick material, used to prevent the bladder from adhering to the impregnated fabric layer 112 of the lateral liner 110. As such, the non-stick bladder is preferably a molded piece made of silicone, as a one-piece bladder with one closed end. Since the bladder is sealed at one end, the only way to get the liner installed with the coating against the host pipe wall is to perform the two-step inversion process as discussed above. This type of bladder material may be used up to 500 times or more before replacement is necessary.

In operation of this embodiment, a lateral liner 110 having a main portion 118 is impregnated with a resinous material. The lateral liner 110 is placed onto a launcher device 122 having a main bladder 120 and an inverted lateral bladder 118. The lateral bladder 118 is everted into the lateral portion 116 of the lateral liner 110. An inversion rope 130 is pulled to re-invert the lateral bladder 118. When the inversion rope 130 is pulled, the lateral liner 110 inverts into the launcher device 122 along with the lateral bladder 118. Additionally, it should be noted that when the lateral liner 110 is loaded onto the launcher device 122, the main portion 118 of the lateral liner 110 rests on top of the main bladder 120. The launcher device is then aligned at a junction of a main pipe 126 and a lateral pipe 124. The main bladder 120 and lateral bladder 118 are inflated, pressing the lateral liner 110 against the junction walls. During inflation of the bladders, a pressure that is substantial enough to force the resinous material through the perforations 115 of the liner should be applied. Such a pressure should be greater than about 0.5 psi. The resinous material is allowed to cure and harden. The main bladder 120 and lateral bladder 118 are deflated and removed from the junction. The launcher device 122 may be re-loaded with a new lateral liner 110 and the method repeated.

There are several advantages of this method. First, it greatly reduces the cost of materials and labor. Labor is reduced because usually the bladders are removed and replaced with a new bladder after the renewal of each junction. The removal and replacement steps are time consuming, labor-intensive steps. Fewer materials are used by using this process, as an operator will purchase only one bladder instead of 500 separate bladders. Secondly, it allows a bladder to be used multiple times. Thirdly, this method provides a superior end product because additional resin will be able to travel through the perforations instead of traveling along the inverting face of the liner, providing additional structural support with the host pipe and preventing resin slugs from curing in the pipe.

The invention has been shown and described above with reference to the preferred embodiments, and it is understood that many modifications, substitutions, and additions may be made which are within the intended spirit and scope of the invention.

I claim:

1. An apparatus for repairing a damaged portion of a pipe, the apparatus comprising:
   a liner including a fabric layer of resin absorbent material and a plastic film disposed on an exterior surface of the fabric layer;
   wherein the liner is capable of being inverted; and
   wherein the integrity of the plastic film is compromised in response to a modification of the plastic film to allow a resinous material to pass from the fabric layer through at least a portion of the plastic film of the liner to the damaged section of the pipe.

2. The apparatus of claim 1 wherein the plastic film is formed from a TPU or PVC material.

3. The apparatus of claim 1 wherein the liner being impregnated with the resinous material and the plastic film contains the resin in the liner prior to installation of the liner.

4. The apparatus of claim 1 wherein the modification of the plastic film comprises perforations that allow resin migration under pressure.

5. The apparatus of claim 4 wherein the perforations are pinholes or slits through the plastic film.

6. The apparatus of claim 4, wherein the perforations of the plastic film travel partially through the plastic film; wherein the structural integrity of the plastic film is compromised in response to the circumferential stretching of the fabric layer to expose a resinous material in the fabric layer to the damaged section of the pipe.

7. A method of lining a junction of a main pipe and a lateral pipe comprising:
   providing a liner including a fabric layer of resin absorbent material and a plastic film layer adhered to an exterior surface of the fabric layer;
   wherein the integrity of the plastic film layer is compromised in response to a modification of the plastic film layer;
   impregnating the liner with a resinous material capable of curing and hardening;
   providing a launcher device having a main bladder and a lateral bladder, wherein the lateral bladder is inverted inside the launcher device;
   everting the lateral bladder into the liner;
   inverting the lateral bladder and at least a portion of the liner into the launcher device together;

moving the liner into the main pipe to a position adjacent the junction of the lateral pipe;

everting the lateral bladder and pressing the plastic film layer of the liner against a wall of the lateral pipe;

inflating the main bladder;

applying pressure to the main bladder and lateral bladder, forcing the resinous material through the plastic film layer to expose the resinous material in the fabric layer to the damaged section of the pipe; and allowing the resinous material to cure and harden.

8. The method of claim 7 wherein the plastic film is formed from a TPU or PVC material.

9. The method of claim 7 wherein the modification of the plastic film comprises perforations that allow resin migration under pressure.

10. The method of claim 9 wherein the perforations are pinholes or slits through the plastic film.

11. The method of claim 9, wherein the perforations of the plastic film travel partially through the plastic film; wherein the structural integrity of the plastic film is compromised in response to the circumferential stretching of the fabric layer to expose a resinous material in the fabric layer to the damaged section of the pipe.

12. The method of claim 7, wherein the main bladder and lateral bladder comprise a silicone material.

13. The method of claim 7, further comprising deflating the lateral bladder and the main bladder;

removing the launcher device from the junction; and providing a new liner and repeating the steps of claim 7 using the new liner at a new junction.

14. An apparatus for repairing a damaged portion of a pipe, the apparatus comprising:

a liner including a fabric layer of resin absorbent material; and a plastic film disposed on an exterior surface of the fabric layer, the plastic film including perforations;

wherein the liner is capable of being inverted into the pipe from a configuration with the plastic film on the inside to a configuration with the plastic film between the fabric layer and the pipe.

* * * * *